United States Patent
Garcia et al.

(10) Patent No.: US 10,246,020 B1
(45) Date of Patent: Apr. 2, 2019

(54) VEHICLE CARGO AREA STRUCTURE

(71) Applicant: Nissan North America, Inc., Franklin, TN (US)

(72) Inventors: Alejandro Ruiz Garcia, Lerma (MX); Leon Gomez, Mexico City (MX)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 15/842,338

(22) Filed: Dec. 14, 2017

(51) Int. Cl.
   *B60R 5/04* (2006.01)
   *B62D 25/08* (2006.01)
   *B60N 2/36* (2006.01)

(52) U.S. Cl.
   CPC .............. *B60R 5/04* (2013.01); *B62D 25/087* (2013.01); *B60N 2002/363* (2013.01)

(58) Field of Classification Search
   CPC . B60R 5/04; B60R 2002/36; B60R 2002/363; B60R 2/36; B62D 25/087
   USPC ..................................... 296/37.16, 65.16, 69
   See application file for complete search history.

(56) References Cited

U.S. PATENT DOCUMENTS

| | | | |
|---|---|---|---|
| 4,443,034 A * | 4/1984 | Beggs | B60N 2/3011 296/65.17 |
| 6,695,380 B1 | 2/2004 | Hicks | |
| 6,926,348 B2 * | 8/2005 | Krueger | B60R 5/04 224/403 |
| 9,073,488 B1 | 7/2015 | Stanczak et al. | |
| 9,096,178 B1 * | 8/2015 | Stanczak | B60R 5/045 |
| 9,278,647 B2 * | 3/2016 | Stanczak | B60R 5/045 |
| 9,457,723 B2 | 10/2016 | Engerman | |
| 9,539,957 B2 | 1/2017 | Engerman | |
| 2003/0015531 A1 * | 1/2003 | Choi | B60R 5/04 220/200 |

\* cited by examiner

*Primary Examiner* — Dennis H Pedder
(74) *Attorney, Agent, or Firm* — Global IP Counselors, LLP

(57) ABSTRACT

A forward panel is removably positionable in a first orientation within a cargo area in which a first surface faces upward and a support wall contacts an upwardly facing surface of the cargo area defining a concealed space between the upwardly facing surface and an opposite second surface of the forward panel, with an edge between the first and second surfaces abutting a rear seat assembly. The forward panel is positionable in a second orientation with the second surface facing upward with the support wall extending upward from the second surface. A rearward panel is removably positioned along the upward facing surface in a third orientation in which a first surface of the rearward panel is co-planar with the first surface of the forward panel with the forward panel in the first orientation.

15 Claims, 15 Drawing Sheets

VEHICLE CARGO AREA STRUCTURE

BACKGROUND

Field of the Invention

The present invention generally relates to a vehicle cargo area structure. More specifically, the present invention relates to a vehicle cargo area structure that includes a forward panel and a rearward panel that fit over a floor area of a cargo area of a vehicle, the forward panel and the rearward panel being movable to a plurality of differing orientations thereby defining a corresponding plurality of configuration of the cargo area.

Background Information

Most SUVs (sports utility vehicles) and hatch back vehicles include a cargo area behind rear seats of the vehicle. In vehicles in which upright portions (vertically oriented portions) of the rear seats can be positioned or folded to a more horizontal orientation, the floor of the cargo area is usually lower than a back surface of the upright portions. Therefore long cargo parcels must be placed on the back surface of the upright portion, with little, if any contact with the floor of the cargo area.

SUMMARY

One object of the present disclosure is to provide a cargo area with a forward panel and a rearward panel that can be removably positioned on an upwardly facing surface of the cargo area in a plurality of orientations, with at least one pair of orientations being such that a seat back surface of a rear seat, the upwardly facing surface of the forward panel and an upwardly facing surface of the rearward panel are all co-planar defining an elongated cargo receiving flat surface.

In view of the state of the known technology, one aspect of the present disclosure is to provide a vehicle cargo area structure with a vehicle body structure, a rear seat assembly, a forward panel and a rearward panel. The vehicle body structure includes a passenger compartment having a floor with a rearward section of the floor defining a cargo area that includes an upwardly facing surface. The rear seat assembly is attached to the floor forward of the cargo area. The rear seat assembly has a seat cushion portion and a seat upright portion moveable between an upright orientation and a folded orientation. The forward panel has a first surface, a second surface opposite the first surface, an edge extending between the first and second surfaces, and a support wall extending from the second surface in a direction away from the first surface. The forward panel is removably positionable in a first orientation within the cargo area in which the first surface faces upward and the support wall contacts the upwardly facing surface defining a concealed space between a forward section of the upwardly facing surface and the second surface with the edge abutting the rear seat assembly. The forward panel is also removably positionable in a second orientation in which the second surface faces upward with the support wall extending upward from the second surface with the first surface overlaying the forward section of the upwardly facing surface of the cargo area. The rearward panel has a first surface and a second surface. The rearward panel is removably positionable along a rearward section of the upward facing surface in a third orientation in which the second surface faces the upwardly facing surface of the cargo area and the first surface is co-planar with the first surface of the forward panel with the forward panel in the first orientation.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
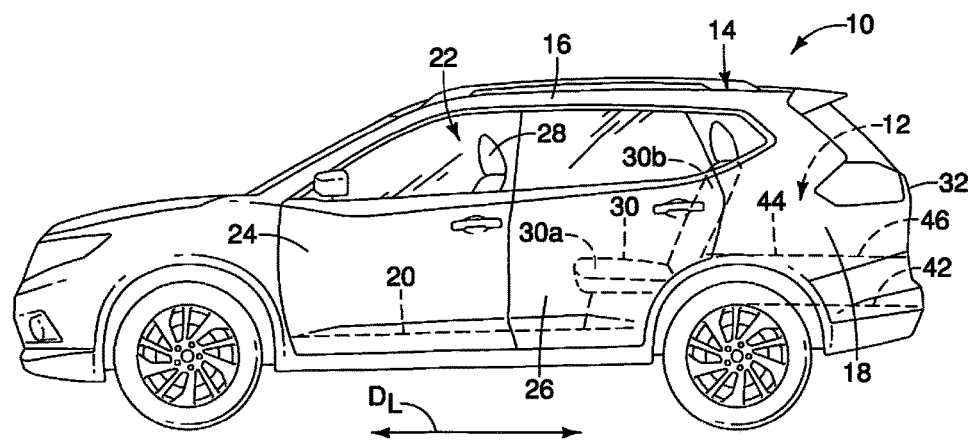
FIG. 1 is a side view of a vehicle that includes a rear seat assembly with a cargo area defined rearward of the rear seat assembly in accordance with a first embodiment.

Referring initially to FIG. 1, a vehicle 10 having a cargo area 12 is illustrated in accordance with a first embodiment. The vehicle 10 also includes a vehicle body structure 14 having, among other features, a roof structure 16, side wall structures 18 (only one side wall structure 18 is shown in FIG. 1) and a floor 20.

A passenger compartment 22 is defined between the side wall structures 18, above the floor 20 and below the roof structure 16. The vehicle body structure 14 includes front doors 24 and rear doors 26 that access the passenger compartment 22. The vehicle 10 and the vehicle body structure 14 defines a lengthwise direction $D_L$.

Front seats 28 are installed to a forward area of the floor 20 and rear seats 30 are installed to a mid-portion of the floor 20 within the passenger compartment 22. The cargo area 12 is defined within the passenger compartment 22 and is located rearward of the rear seats 30. The cargo area 12 can be accessed via a cargo area door 32, and/or by opening the rear doors 26.

Figure 2:
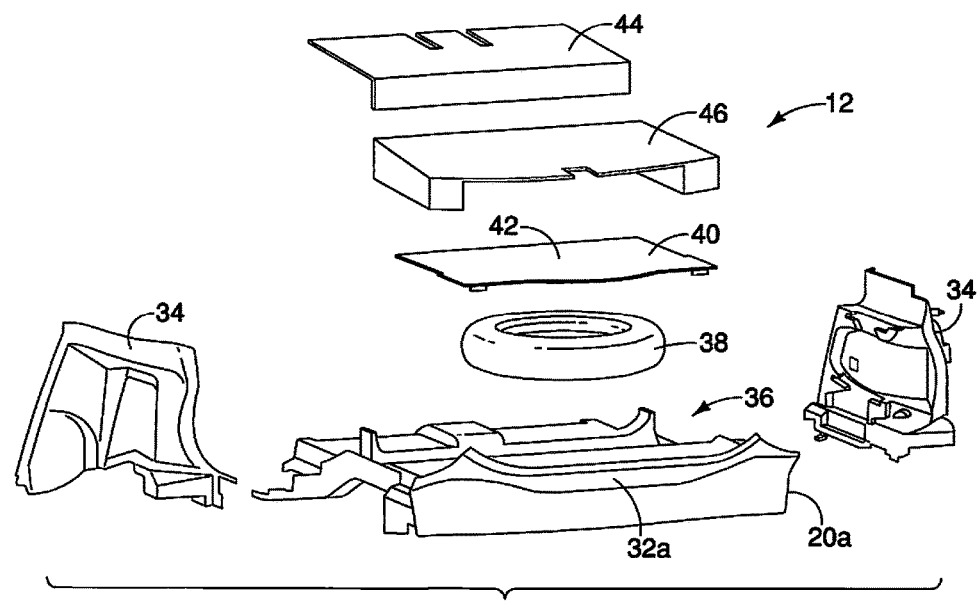
FIG. 2 is an exploded perspective view of the cargo area showing interior side walls, a spare tire storage area, a tire cover panel, a forward panel and a rearward panel in accordance with the first embodiment.

As show in FIG. 2, the cargo area 12 is further defined by a pair of interior side panels 34 that are fixed to interior areas of the side wall structure 18 in a conventional manner. Since side wall structure 18 and interior side panels 34 are conventional structures, further description is omitted for the sake of brevity. Below the cargo area 12, a portion 20a of the floor 20 can optionally include a spare tire storage area 36. A spare tire 38 can be received in the spare tire storage area 36. The spare tire 38 and the spare tire storage area 36 can be covered and concealed by a tire cover panel 40. It should be understood from the drawings and the description herein that the spare tire storage area 36, the spare tire 38 and the tire cover panel 40 can be eliminated. Specifically, the spare tire 38 can alternatively be stored elsewhere within or on the vehicle body structure 14.

In the depicted embodiment, the tire cover panel 40 serves as an extension of the floor 20, concealing the spare tire 38. The tire cover panel 40 defines an upwardly facing surface 42 that can alternatively be defined by the floor 20 if the spare tire 38 is stored elsewhere on or within the vehicle body structure 14.

The rear seats 30 are attached to the floor 20 in a conventional manner via, for example, mechanical fasteners (not shown). The rear seats 30 include a seat cushion portion 30a and a seat upright portion (a seatback portion) 30b. The seat upright portion 30a is moveable between an upright orientation (FIG. 1) and a folded orientation shown in FIGS. 3-7. The seat cushion portion 30a and the seat upright portion 30b are configured to pivot relative to one another about a hinge structure 30c in a conventional manner.

The vehicle body structure 14 further defines a rear cargo area opening partially defined by a sill area 32a (FIGS. 2, 3 and 4) that is covered by the cargo area door 32, with the cargo area door 32 in a closed orientation (FIG. 1).

In a first embodiment, as shown in FIGS. 2-15, the cargo area 12 further includes a forward panel 44 and a rearward panel 46. The forward panel 44 and the rearward panel 46 are dimensioned and shaped to fit between the rear seats 30 and a sill area 32a, and further between the pair of interior side panels 34.

As shown in FIGS. 3-14, the forward panel 44 has a first surface 50, a second surface 52 opposite the first surface 50, an edge 54 extending between the first and second surfaces 50 and 52, and a support wall 56. The support wall 56 extends from the second surface 52 in a direction away from the first surface 50. Further, the support wall 56 extends in a direction that is perpendicular to the second surface 52.

The forward panel 44 is removably positioned in a first orientation shown in FIGS. 3 and 5-7 within the cargo area 12. In the first orientation, the first surface 50 faces upward and the support wall 56 contacts the upwardly facing surface 42. Also, in the first orientation, the forward panel 44 defines a concealed space $S_1$ is between a forward section of the upwardly facing surface 42 and the second surface 52. Further, in the first orientation, the edge 54 of the forward panel 44 abuts the seat upright portion 30b of the rear seat 30

Figure 4:
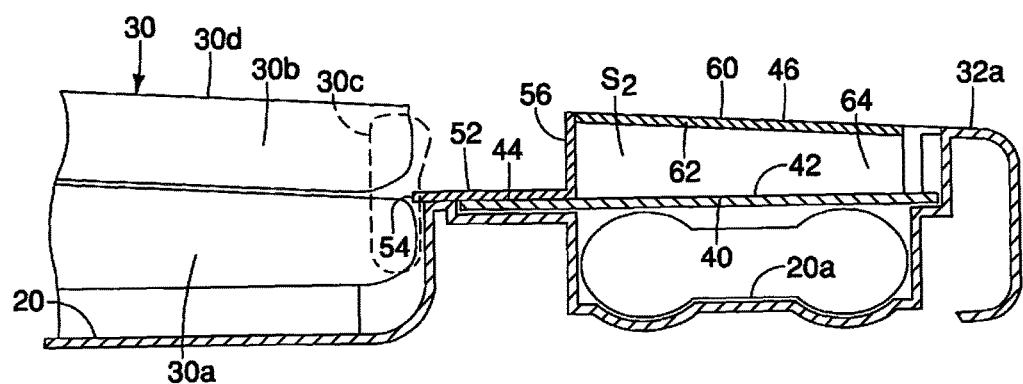
FIG. 4 is another cross-sectional view of the cargo area similar to FIG. 3, showing the forward panel in a second orientation and the rearward panel in the third orientation in accordance with the first embodiment.

As shown in FIG. 4, the forward panel 44 can be moved to a second orientation. In the second orientation, the second surface 52 faces upward with the support wall 56 extending upward from the second surface 52. In the second orientation, the first surface 50 overlays the forward section of the upwardly facing surface 42.

Figure 5:
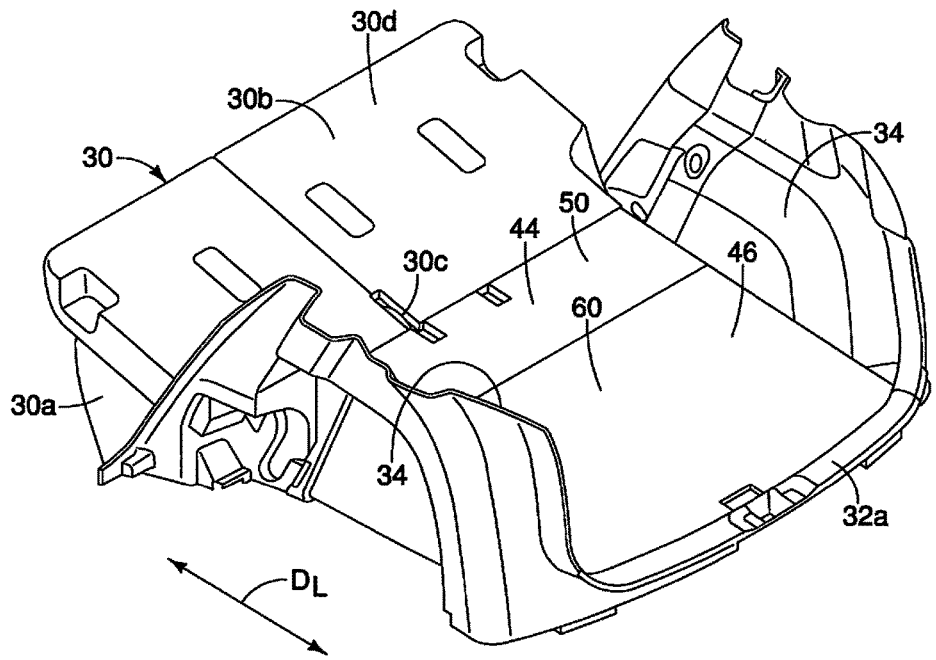
FIG. 5 is a perspective view of the cargo area showing the forward panel in the first orientation and the rearward panel in the third orientation in accordance with the first embodiment.
Figure 6:
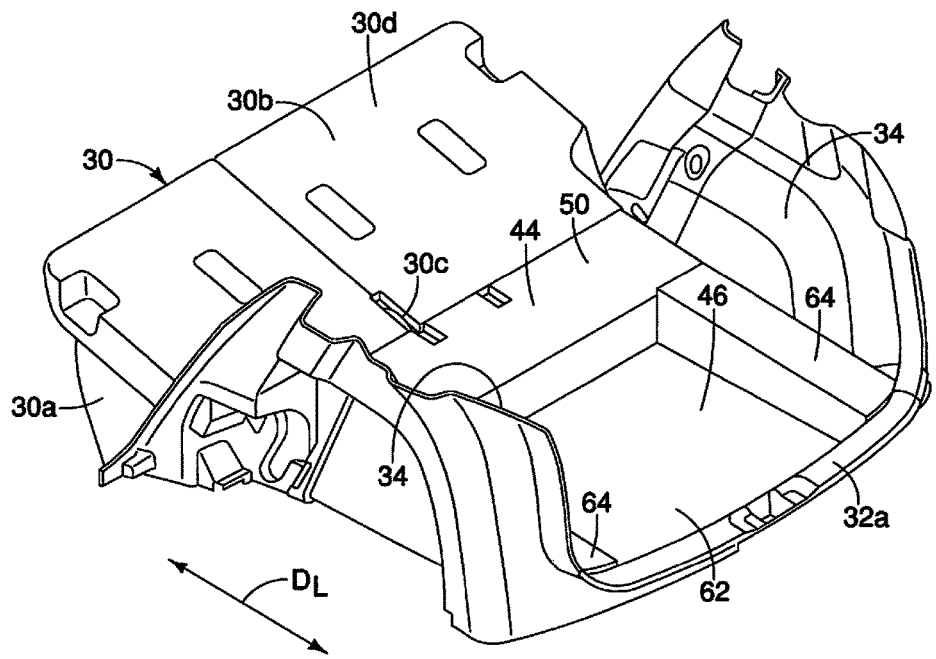
FIG. 6 is another perspective view of the cargo area showing the forward panel in the first orientation and the rearward panel in a fourth orientation in accordance with the first embodiment.
Figure 7:
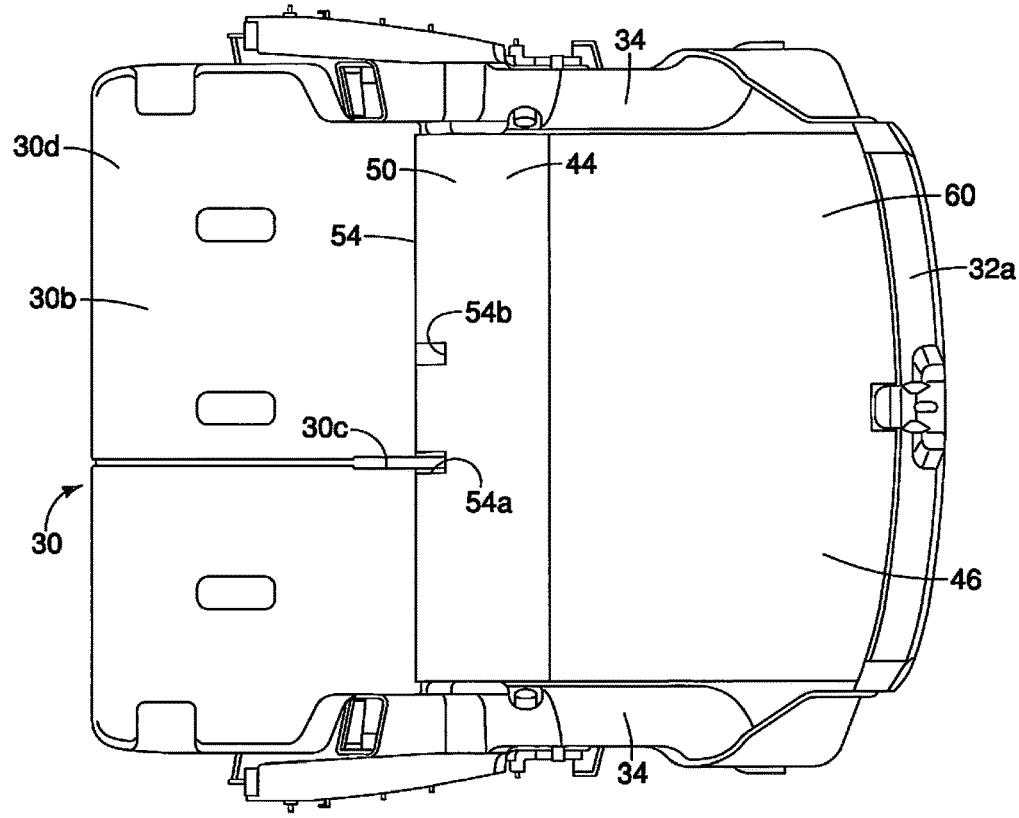
FIG. 7 is a top view of the cargo area showing the forward panel in the first orientation and the rearward panel in the third orientation in accordance with the first embodiment.

As shown in FIGS. 5-9 and 11-13, the edge 54 of the forward panel 44 includes a first gap 54a and a second gap 54b. As shown in FIGS. 5-7 with the forward panel 44 in the first orientation the hinge structure 30c extends into the first gap 54a. The rear seats 30 are split 60-40 percent in a conventional manner. The hinge structure 30c is therefore off-center relative to the rear seats 30. Consequently, when the forward panel 44 is in the first orientation, the hinge structure 30c extends into the first gap 54a. However, when the forward panel 44 is in the second orientation, the hinge structure 30c extends into the second gap 54b.

Figure 3:
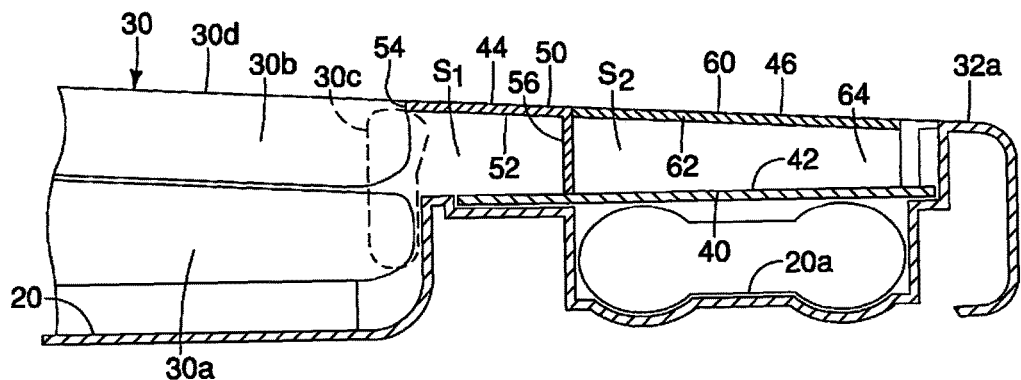
FIG. 3 is a cross-sectional view of the cargo area showing the forward panel in a first orientation and the rearward panel in a third orientation in accordance with the first embodiment.

As shown in FIGS. 3-5, the rearward panel 46 has a first surface 60 and a second surface 62. The rearward panel is positioned along a rearward section of the upward facing surface 42 in a third orientation in which the second surface 62 faces downward and faces the upwardly facing surface 42. In the third orientation, the first surface 60 is co-planar with the first surface 50 of the forward panel 44 with the forward panel 44 in the first orientation.

The rearward panel 46 and the forward panel 44 are dimensioned and configured such that with the seat upright portion 30b in the folded orientation, the forward panel 44 in the first orientation and the rearward panel 46 positioned in the third orientation, the first surface 50 of the forward panel 44, the first surface 60 of the rearward panel 46 and a back surface 30d of the seat upright portion 30b are all co-planar.

The rearward panel 46 further includes a pair of support walls 64 fixed to and extending from opposite lateral sides of the second surface 62. The pair of support walls 64 contact the rearward section of the upwardly facing surface 42 and define another concealed space $S_2$ between the upwardly facing surface 42 and the second surface 62 of the rearward panel 46. The another concealed space $S_2$ is further confined between the pair of support walls 64.

The rearward panel 46 is removable from the third orientation and can be put onto the upwardly facing surface in a fourth orientation shown in FIG. 6. In the fourth orientation, the first surface 60 of the rearward panel 46 overlays the upwardly facing surface 42 and the second surface 62 faces upward along with the pair of support walls 64. Specifically, in the fourth orientation, the pair of support walls 64 extend upward from the second surface 60 and are exposed, defining a cargo receiving space therebetween.

Figure 8:
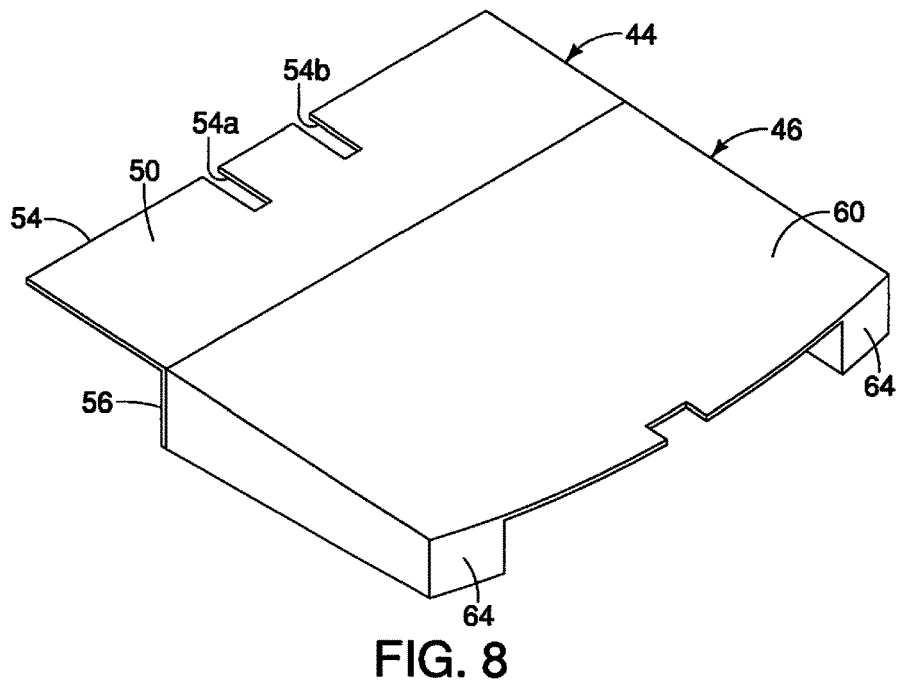
FIG. 8 is a perspective view of the forward panel and the rearward panel shown removed from the cargo area with the forward panel in the first orientation and the rearward panel in the third orientation in accordance with the first embodiment.
Figure 9:
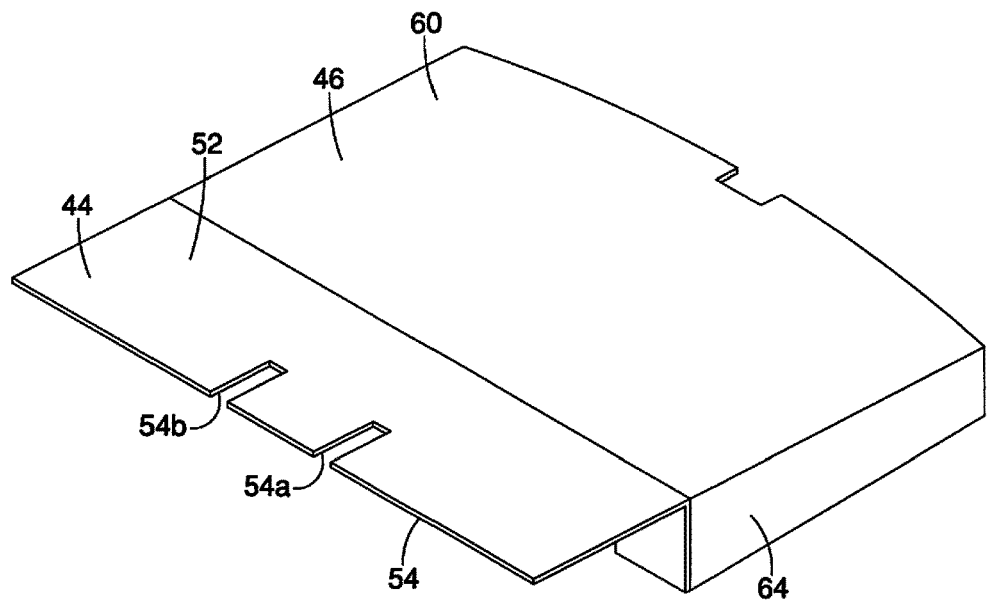
FIG. 9 is another perspective view of the forward panel and the rearward panel shown removed from the cargo area with the forward panel in the first orientation and the rearward panel in the third orientation in accordance with the first embodiment.
Figure 10:
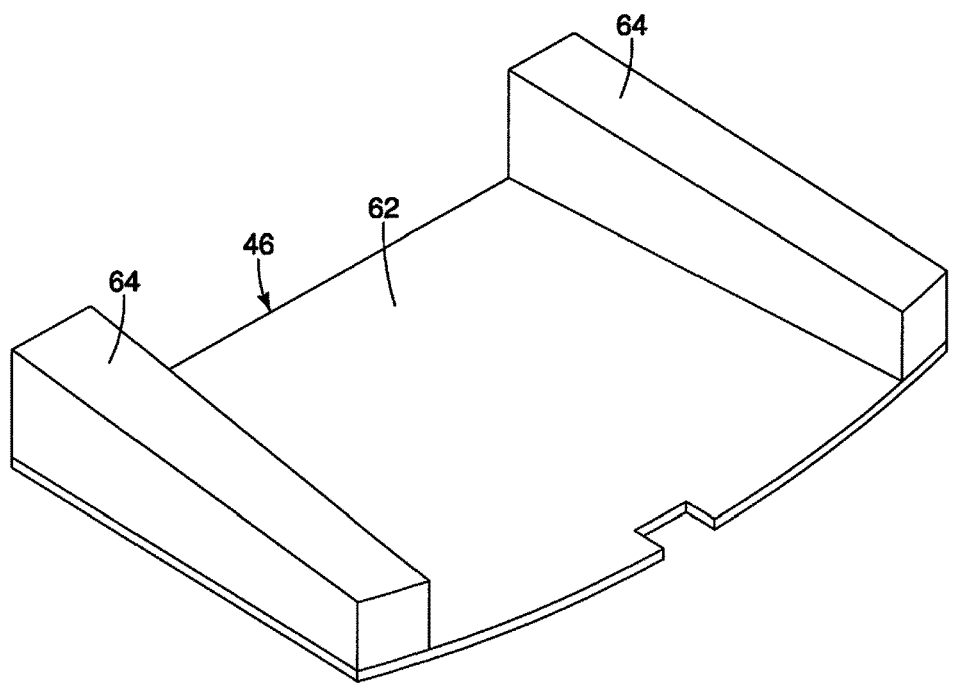
FIG. 10 is a perspective view of the rearward panel shown removed from the cargo area with the rearward panel in the fourth orientation in accordance with the first embodiment.
Figure 11:
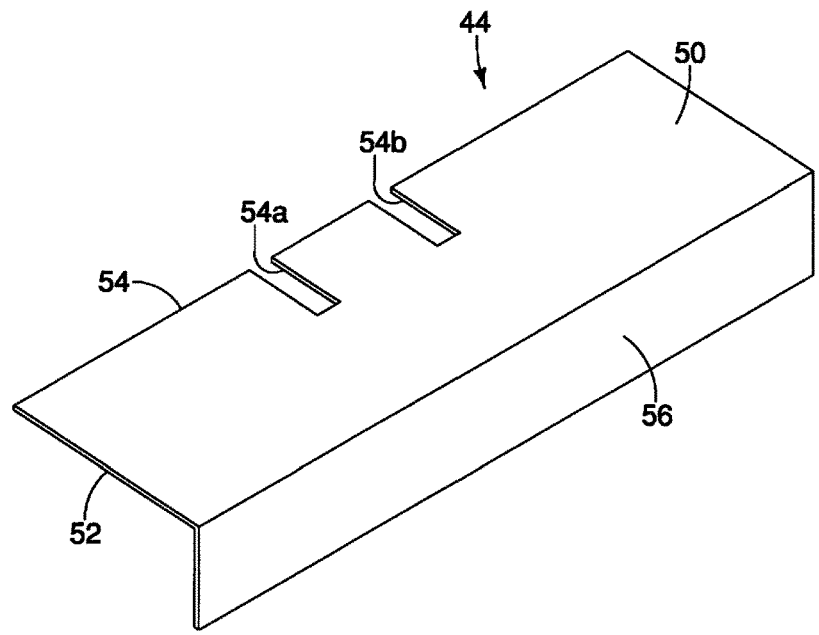
FIG. 11 is a perspective view of the forward panel shown removed from the cargo area with the forward panel in the first orientation in accordance with the first embodiment.
Figure 12:
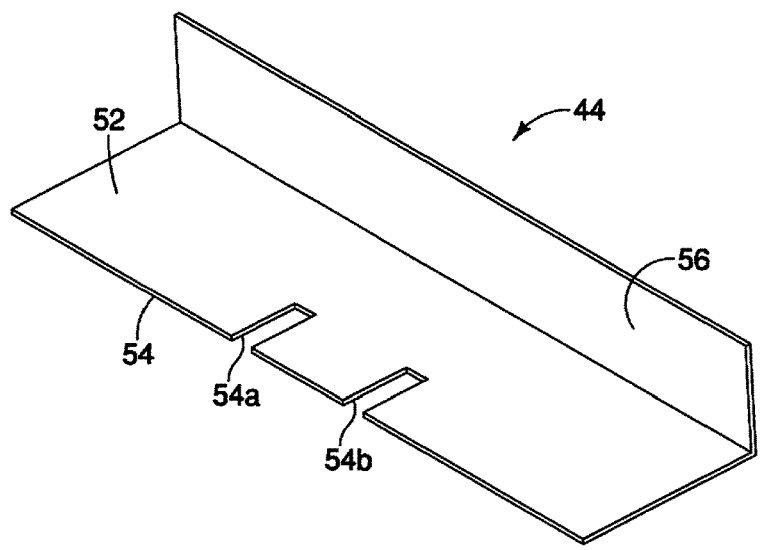
FIG. 12 is another perspective view of the forward panel shown removed from the cargo area with the forward panel in the second orientation in accordance with the first embodiment.
Figure 13:
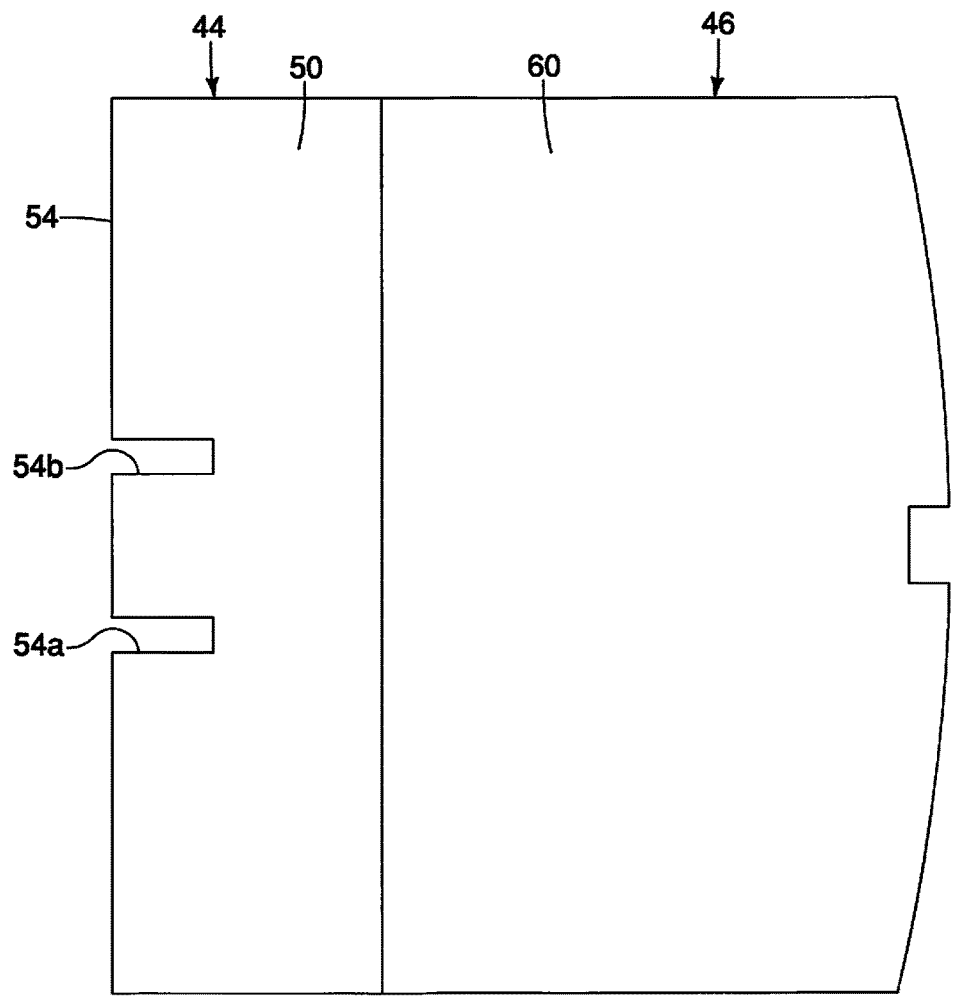
FIG. 13 is a top view of the forward panel and the rearward panel shown removed from the cargo area with the forward panel in the first orientation and the rearward panel in the third orientation in accordance with the first embodiment.
Figure 14:
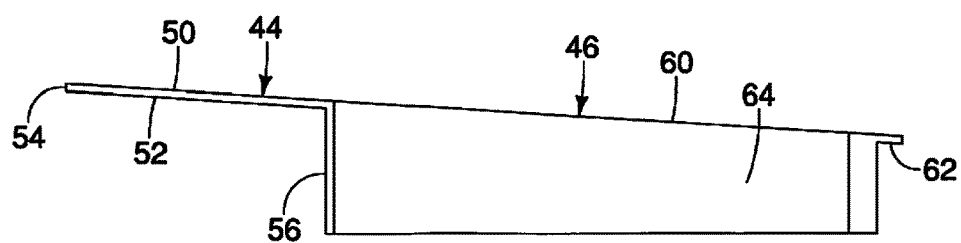
FIG. 14 is a side view of the forward panel and the rearward panel shown removed from the cargo area with the forward panel in the first orientation and the rearward panel in the third orientation in accordance with the first embodiment.
Figure 15:
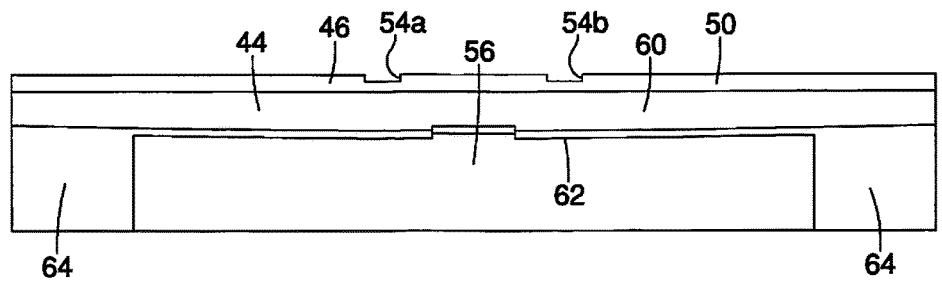
FIG. 15 is a rear view of the forward panel and the rearward panel shown removed from the cargo area with the forward panel in the first orientation and the rearward panel in the third orientation in accordance with the first embodiment.
Figure 16:
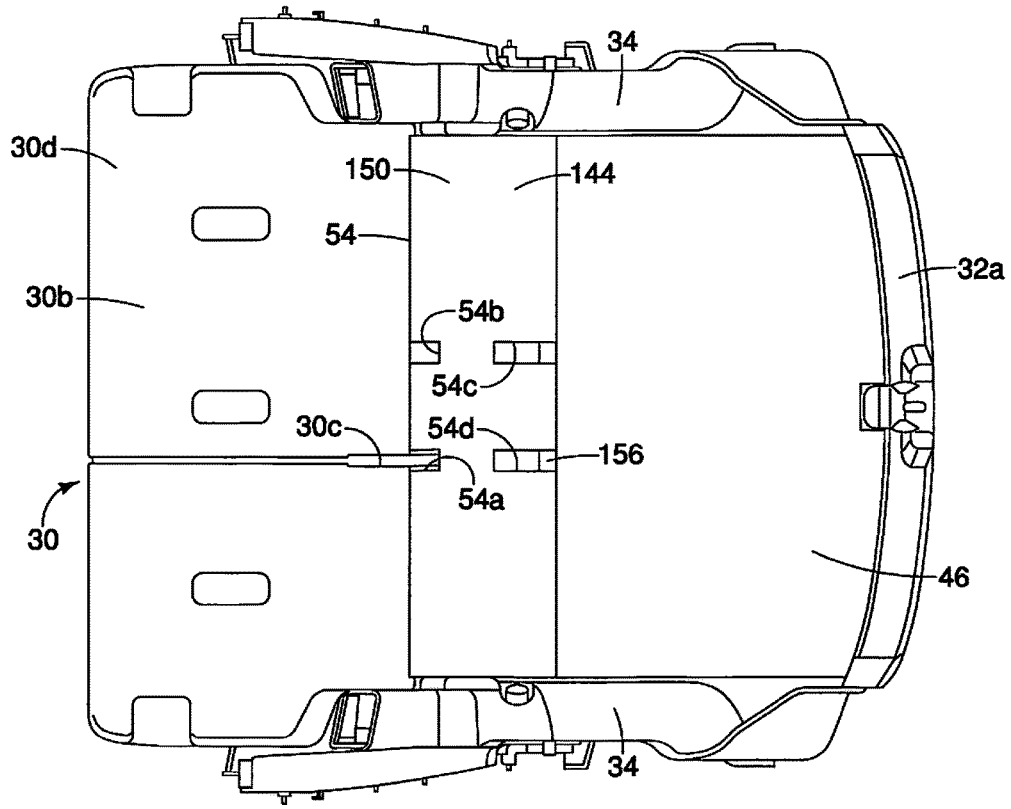
FIG. 16 is a top view of the cargo area showing a forward panel in the first orientation and the rearward panel in the third orientation in accordance with a second embodiment.

As shown in FIGS. 5, 8 and 10, the pair of support walls 64 extend in the lengthwise direction $D_L$ with the rearward panel in either of the third orientation and the fourth orientation.

The forward panel 44 and the rearward panel 46 as described above, are dimensioned to fit snuggly within the space above the upwardly facing surface 42, between the interior side panels 34, and between the sill area 32a and the rear seats 30.

With the forward panel 44 in the first orientation, the rearward panel 46 in the third orientation, and the seat upright portion 30b as shown in FIGS. 3, 5 and 7, the back surface 30d of the rear seats 30, the first surface 50 of the forward panel 44 and the first surface 60 of the rearward panel 46 are all co-planar. Therefore, as shown in FIGS. 3, 5 and 7, the cargo area 12 is provided with a flat surface upon which to position long cargo pieces that require a flat smooth surface for transporting.

Further, the forward panel 44 can be independently repositioned to the second orientation (FIG. 4), and the rearward panel 46 can be independently repositioned to the fourth orientation (FIG. 6) thereby providing a variety of differing cargo receiving configurations.

Further, with the forward panel 44 in the first orientation (FIG. 3), the hidden, concealed space $S_1$ is defined. The concealed space $S_1$ can be used to hide important possessions or cargo, or can conceal a vehicle accessory, such as an audio component. As well, with the rearward panel 46 in the third orientation (FIGS. 3-5 and 7), the hidden, concealed space $S_2$ is defined. The concealed space $S_1$ can be used to hide important possessions or cargo, or can conceal a vehicle accessory, such as an audio component.

The forward panel 44 and the rearward panel 46 can be made of any of a variety of materials. For example, the forward panel 44 and the rearward panel 46 can be made of expanded polyethylene covered with carpet and/or textile material. However, it should be understood from the drawings and the description herein that the forward panel 44 and the rearward panel 46 can be made other materials, such as a cellulose fiber material covered with textile, or Styrofoam material similarly covered with textile material. Further, in the depicted first embodiment, the forward panel 44 and the rearward panel 46 are depicted with relatively thin thicknesses (approximately 0.75 inches to 2.0 inches thick). The forward panel 44 and the rearward panel 46 can be made with increased thicknesses depending upon the material used during the manufacturing process, and/or calculated load bearing requirements.

Finally, the forward panel 44 and the rearward panel 46 can include hoop and hook textile materials such as, for example, Velcro® materials to assist in maintaining corresponding positions the forward panel 44 and the rearward panel 46 in desired orientations within the cargo area 12.

Second Embodiment

Referring now to FIGS. 16-25, the cargo area 12 with a forward panel 144 and the rearward panel 46 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the second embodiment, the cargo area 12 and the rearward panel 46 are as described in the first embodiment. In the second embodiment, the forward panel 144 replaces the forward panel 44 of the first embodiment.

The forward panel 144 includes a first surface 150, a second surface 152, the edge 54 and a support wall 156. The edge 54 includes the first and second gaps 54a and 54b as described in the first embodiment. The forward panel 144 further includes a third gap 54c and a fourth gap 54d located above and extending into the support wall 156.

In the second embodiment, the orientation of the forward panel 144 can be reversed relative to the lengthwise direction $D_L$. Specifically, in the first orientation of the forward panel 144, as in the first embodiment, the edge 54 abuts the rear seats 30, and the support wall 156 abuts the rearward panel 46. In the second embodiment, the forward panel 144 can be moved to a first reversed orientation in which the first surface 150 faces upward, the support wall 156 contacts the upwardly facing surface and abuts the rear seat 30. Further, in the first reversed orientation, the edge 54 of the forward panel 144 abuts the rearward panel 46.

Figure 17:
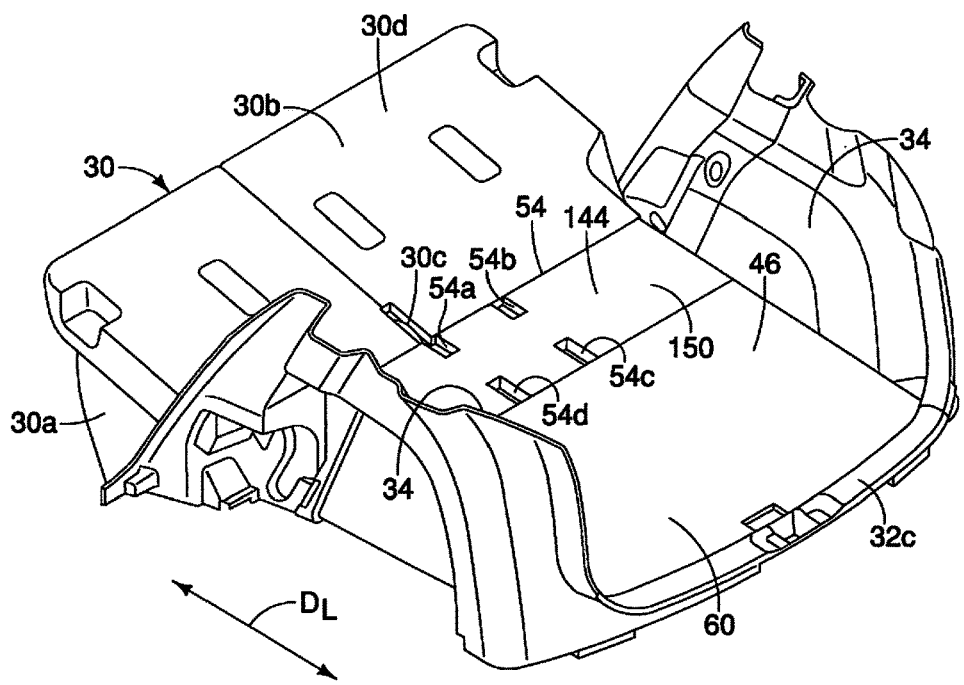
FIG. 17 is a perspective view of the cargo area showing the forward panel in the first orientation and the rearward panel in the third orientation in accordance with the second embodiment.
Figure 18:
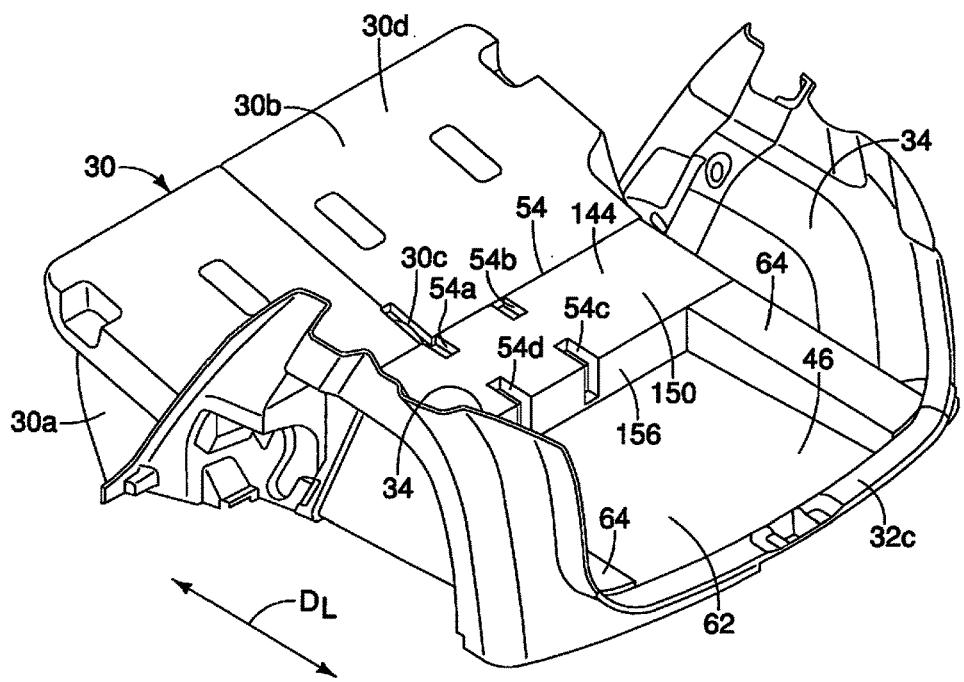
FIG. 18 is another perspective view of the cargo area showing the forward panel in the first orientation and the rearward panel in a fourth orientation in accordance with the second embodiment.
Figure 19:
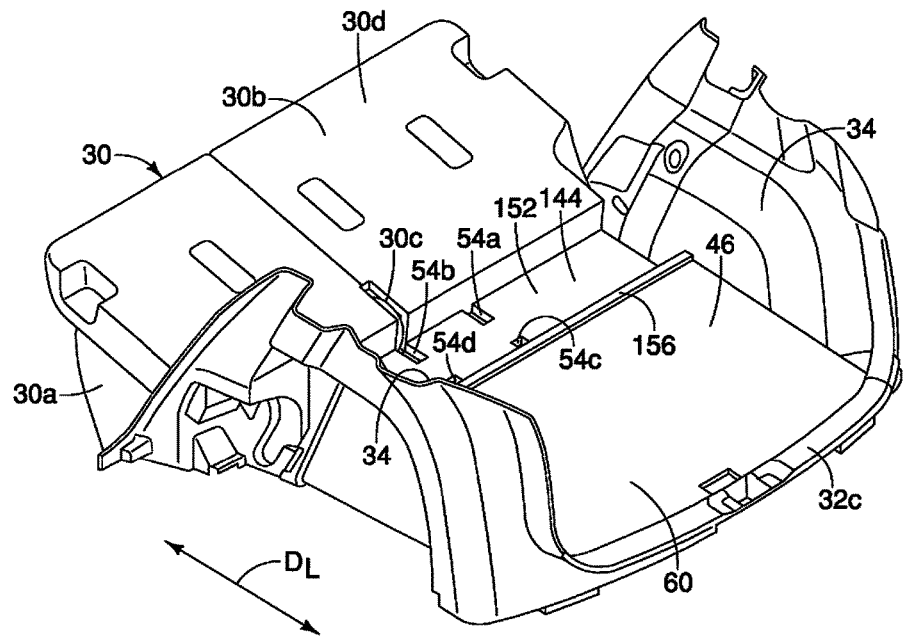
FIG. 19 is yet another perspective view of the cargo area showing the forward panel in a second orientation and the rearward panel in the third orientation in accordance with the second embodiment.
Figure 20:
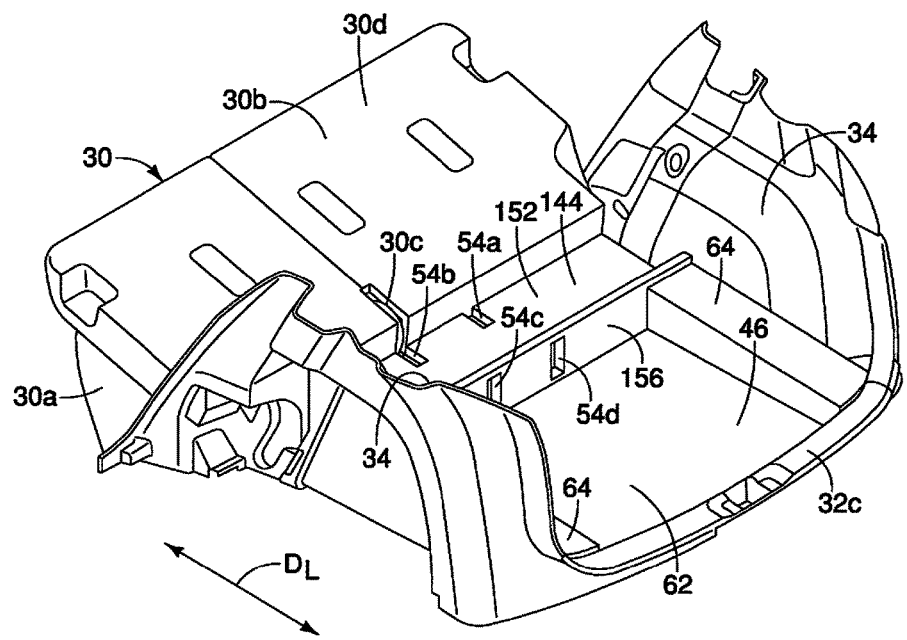
FIG. 20 is another perspective view of the cargo area showing the forward panel in the second orientation and the rearward panel in the fourth orientation in accordance with the second embodiment.
Figure 21:
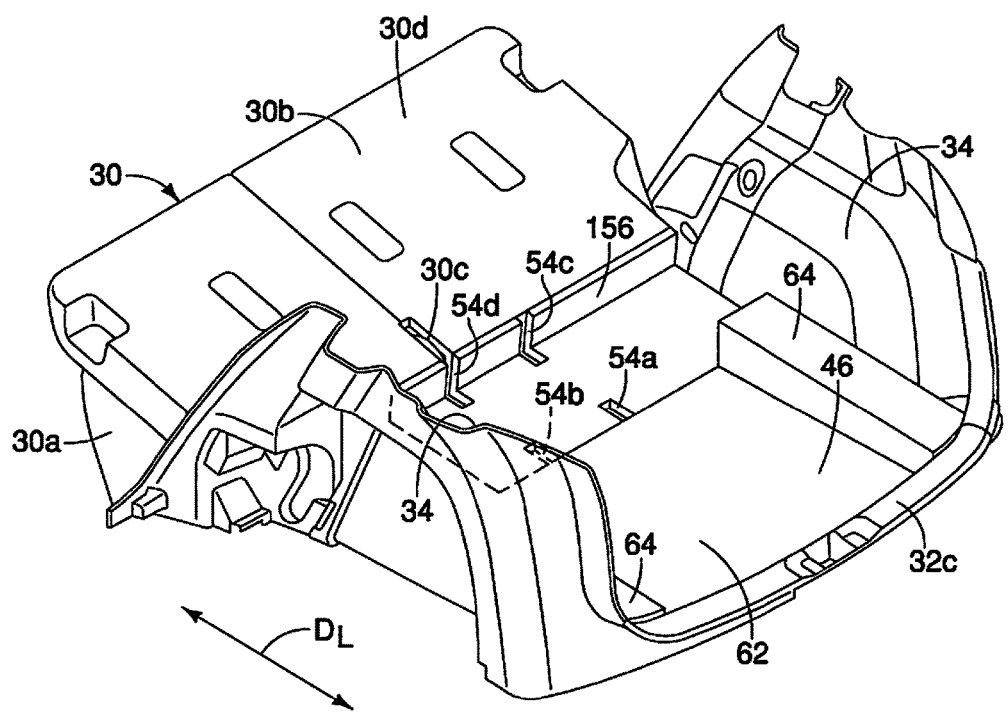
FIG. 21 is still another perspective view of the cargo area showing the forward panel in a reversed orientation and the rearward panel in the fourth orientation in accordance with the second embodiment.
Figure 22:
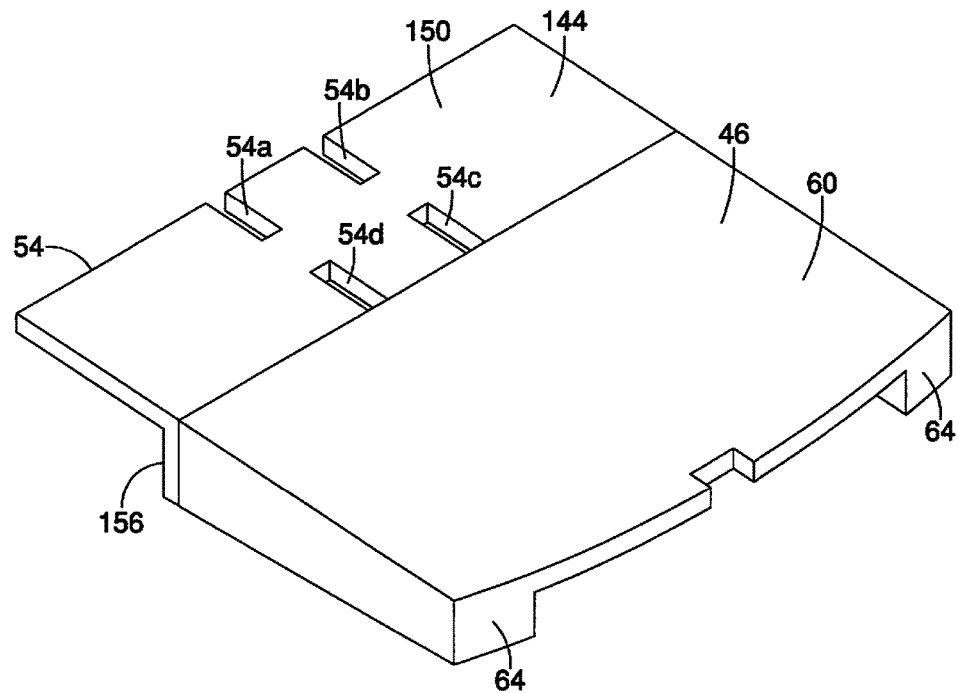
FIG. 22 is a perspective view of the forward panel and the rearward panel shown removed from the cargo area with the forward panel in the first orientation and the rearward panel in the third orientation in accordance with the second embodiment.
Figure 23:
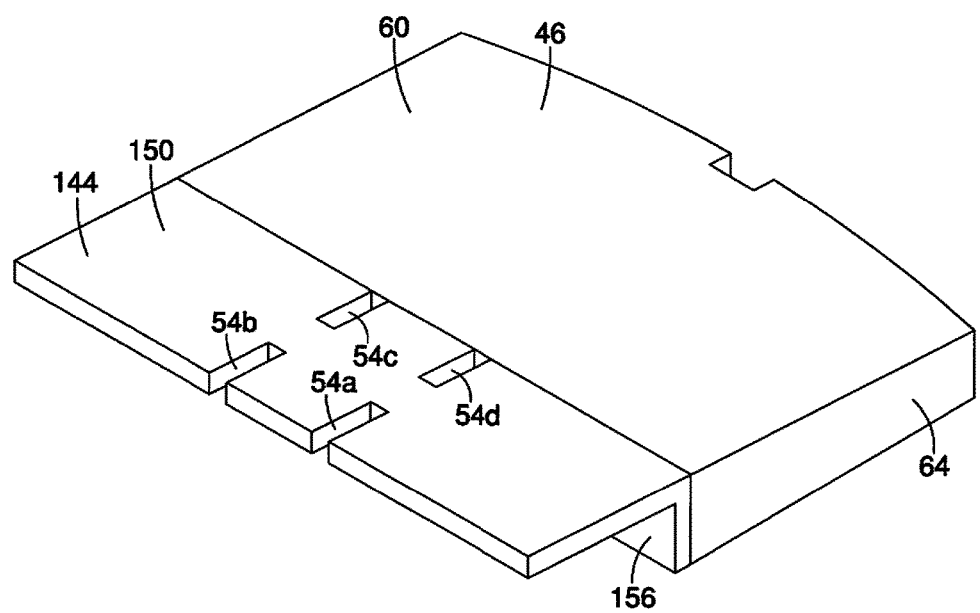
FIG. 23 is another perspective view of the forward panel and the rearward panel shown removed from the cargo area with the forward panel in the first orientation and the rearward panel in the third orientation in accordance with the second embodiment.
Figure 24:
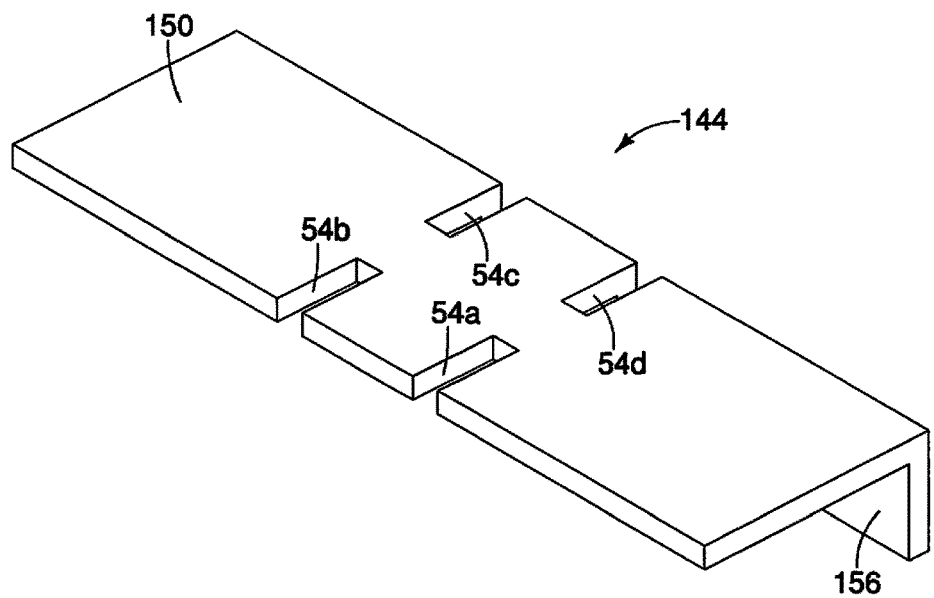
FIG. 24 is a perspective view of the forward panel shown removed from the cargo area with the forward panel in the first orientation in accordance with the second embodiment.
Figure 25:
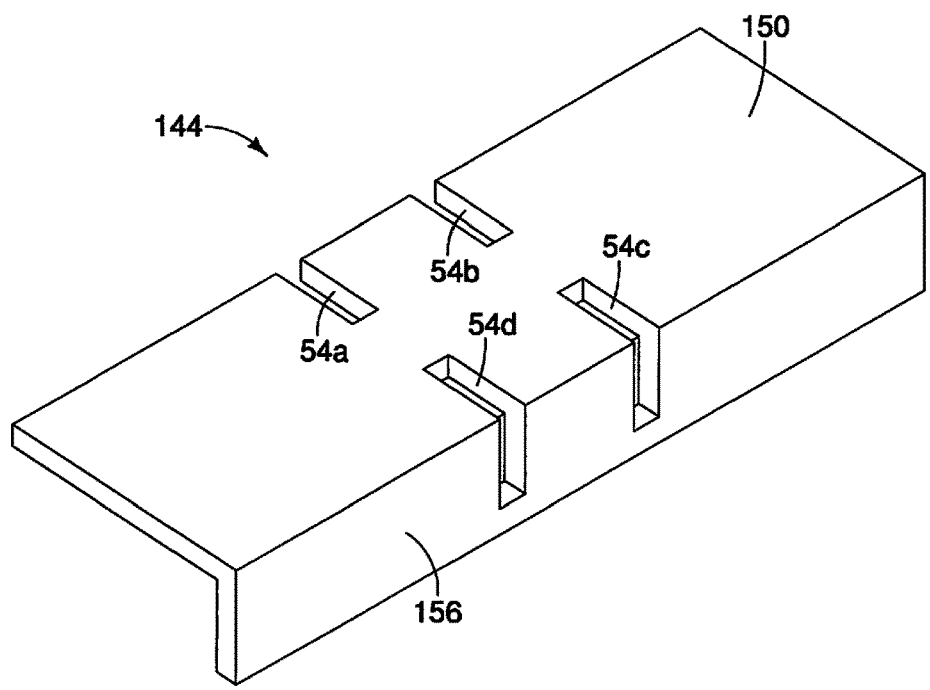
FIG. 25 is another perspective view of the forward panel shown removed from the cargo area with the forward panel in the first orientation in accordance with the second embodiment.
Figure 26:
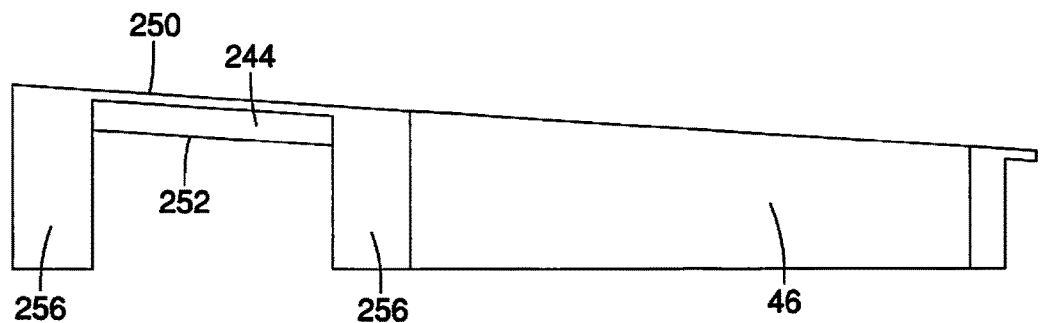
FIG. 26 is a side view of a forward panel and the rearward panel shown removed from the cargo area in accordance with a third embodiment.
Figure 27:
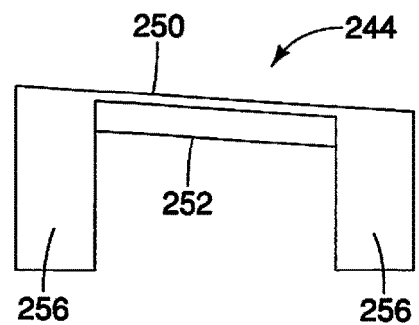
FIG. 27 is a side view of the forward panel shown removed from the cargo area in accordance with the third embodiment.
Figure 28:
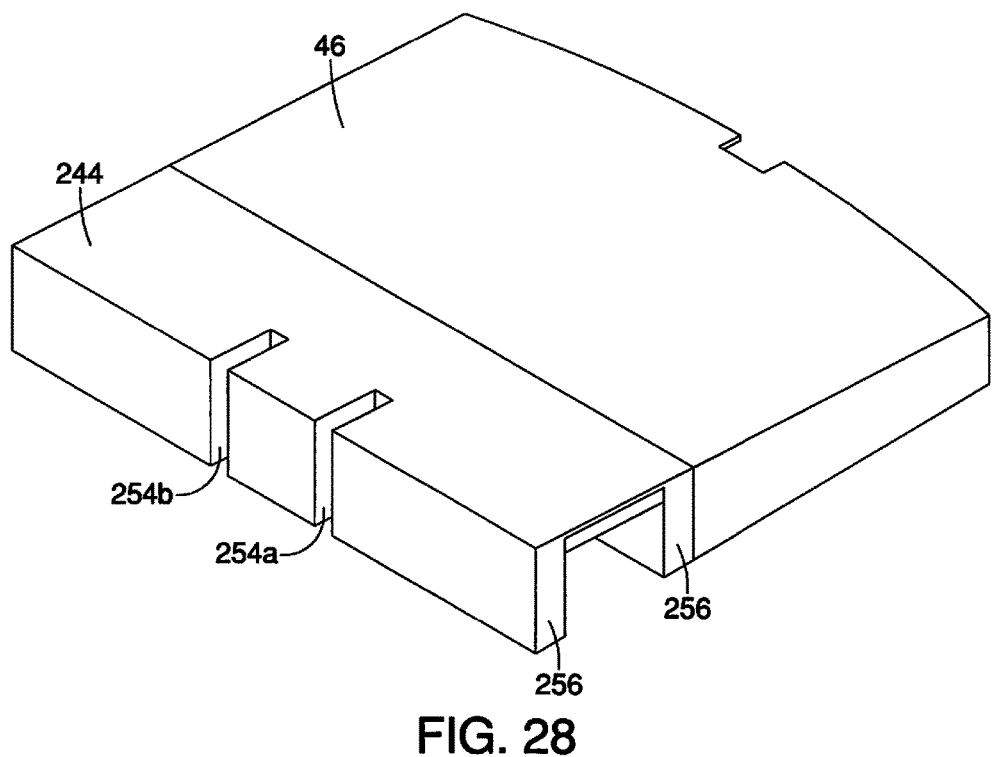
FIG. 28 is a perspective view of the forward panel and the rearward panel shown removed from the cargo area with the forward panel in the first orientation and the rearward panel in the third orientation in accordance with the third embodiment.
Figure 29:
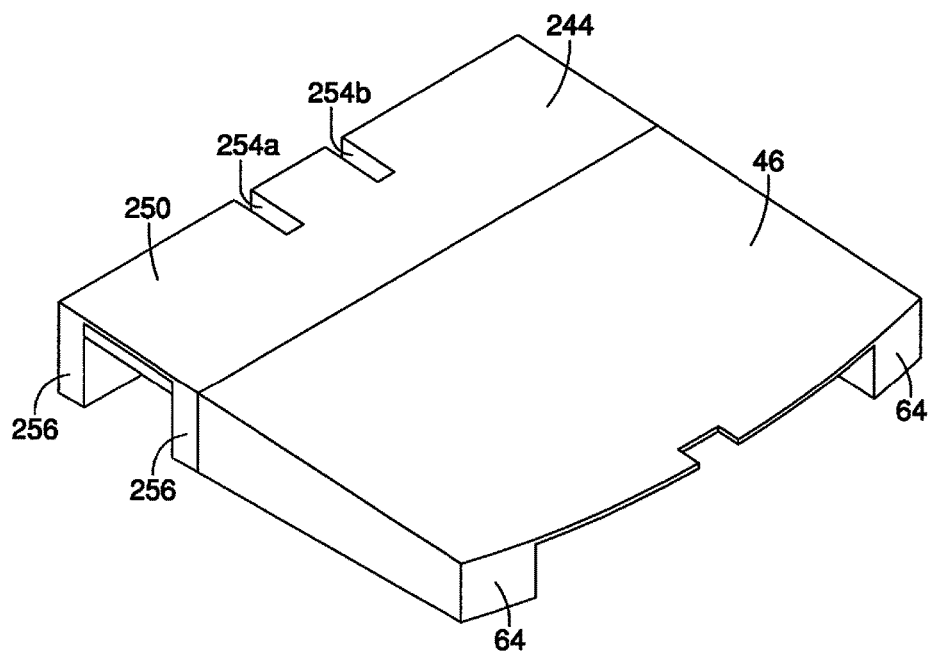
FIG. 29 is another perspective view of the forward panel and the rearward panel shown removed from the cargo area with the forward panel in the first orientation and the rearward panel in the third orientation in accordance with the third embodiment.

FIG. 17 shows the forward panel 144 in the first orientation, with the rearward panel 46 in the third orientation. In the first orientation, the hinge 30c extends into the gap 54a. FIG. 18 shows the forward panel 144 in the first orientation, with the rearward panel 46 in the fourth orientation. FIG. 19 shows the forward panel 144 in the first reversed orientation, with the rearward panel 46 in the third orientation. In the first reversed orientation, the hinge 30c extends into the gap 54b. FIG. 20 shows the forward panel 144 in the first reversed orientation, with the rearward panel 46 in the fourth orientation. In FIG. 20, the support wall 156 divides the cargo area 12 into a forward section and a rearward section. FIG. 21 shows the forward panel 144 in a second reversed orientation, with the rearward panel 46 in the fourth orientation. In FIG. 21, the support wall 156 abuts the rear of the seat assembly 30. Further the cargo area 12 is provided with a uniform flat surface defined by both the forward panel 144 and the rearward panel 46.

Third Embodiment

Referring now to FIGS. 25-29, a forward panel 244 and the rearward panel 46 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

In the third embodiment, the rearward panel 46 is as described in the first embodiment. In the third embodiment, the forward panel 244 replaces the forward panel 44 of the first embodiment.

The forward panel 244 includes a first surface 150, a second surface 152 and a pair of support walls 256. The pair of support walls 256 are parallel to one another.

The various vehicle structures other than the forward panel and the rearward panel are conventional components that are well known in the art. Since such structures are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle cargo area structure. Accordingly, these terms, as utilized to describe the present invention should be interpreted relative to a vehicle equipped with the vehicle cargo area structure.

The term "configured" as used herein to describe a component, section or part of a device structure that is constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle cargo area structure, comprising
a vehicle body structure including a passenger compartment having a floor, a rearward section of the floor defining a cargo area that includes an upwardly facing surface;
a rear seat assembly attached to the floor forward of the cargo area having a seat cushion portion and a seat upright portion moveable between an upright orientation and a folded orientation;
a forward panel having a first surface, a second surface opposite the first surface, an edge extending between the first and second surfaces, and a support wall extending from the second surface in a direction away from the first surface, the forward panel being removably positionable in a first orientation within the cargo area in which the first surface faces upward and the support wall contacts the upwardly facing surface defining a concealed space between a forward section of the upwardly facing surface and the second surface with the edge abutting the rear seat assembly, and removably positionable in a second orientation in which the second surface faces upward with the support wall extending upward from the second surface with the first surface overlaying the forward section of the upwardly facing surface of the cargo area; and a rearward panel having a first surface and a second surface, the rearward panel being removably positioned along a rearward section of the upward facing surface in a third orientation in which the second surface faces the upwardly facing surface of the cargo area and the first surface is co-planar with the first surface of the forward panel with the forward panel in the first orientation.

2. The vehicle cargo area structure according to claim 1, wherein
the rearward panel and the forward panel are dimensioned and configured such that with the seat upright portion in the folded orientation, the forward panel in the first orientation and the rearward panel positioned in the third orientation, the first surface of the forward panel, the first surface of the rearward panel and a back surface of the seat upright portion are all co-planar.

3. The vehicle cargo area structure according to claim 1, wherein
the rearward panel includes a pair of support walls fixed to and extending from the second surface, the pair of support walls contact the rearward section of the upwardly facing surface and define another concealed space between the rearward section of the upwardly facing surface and the second surface of the rearward panel.

4. The vehicle cargo area structure according to claim 3, wherein
the rearward panel and the forward panel are dimensioned and configured such that with the seat upright portion in the folded orientation, the forward panel in the first orientation and the rearward panel positioned in the third orientation, the first surface of the forward panel, the first surface of the rearward panel and a back surface of the seat upright portion are all co-planar.

5. The vehicle cargo area structure according to claim 3, wherein
the vehicle body structure defines a lengthwise direction, and
the pair of support walls extend in the lengthwise direction with the rearward panel in the third orientation.

6. The vehicle cargo area structure according to claim 5, wherein
the support wall of the forward panel extends in a direction perpendicular to the lengthwise direction when positioned in the first orientation.

7. The vehicle cargo area structure according to claim 3, wherein
the rearward panel is removably positionable to a fourth orientation in which the first surface overlays the upwardly facing surface with the second surface and the pair of support walls facing upward.

8. The vehicle cargo area structure according to claim 1, wherein
the floor of the vehicle body structure within the cargo area includes a spare tire storage space, the upwardly facing surface being defined by a removable panel that conceals the spare tire storage space.

9. The vehicle cargo area structure according to claim 1, wherein
the support wall extends in a direction that is perpendicular to the second surface.

10. The vehicle cargo area structure according to claim 1, wherein
the seat cushion portion includes a hinge structure that attach to the seat upright portion and is configured such that the seat upright portion pivots about the hinge structures between the upright orientation and the folded orientation, and
the edge of the forward panel includes a first gap positioned such that the hinge structure of the seat cushion portion extends into the first gap with the forward panel in the first orientation.

11. The vehicle cargo area structure according to claim 10, wherein
the edge of the forward panel includes a second gap spaced apart from the first gap that is positioned such that the hinge structure of the seat cushion portion extends into the second gap with the forward panel in the second orientation.

12. The vehicle cargo area structure according to claim 11, wherein
the forward panel is removably positionable to a first reversed orientation in which the second surface faces upward, the support wall of the forward panel abuts the rear seat assembly, and the edge of the forward panel abuts the rearward panel.

13. The vehicle cargo area structure according to claim 12, wherein
the support wall of the forward panel includes a third gap that extends to the first surface and the second surface of the forward panel, the hinge structure of the seat cushion portion extending into the third gap with the forward panel in the first reversed orientation.

14. The vehicle cargo area structure according to claim 13, wherein
the forward panel is removably positionable to a second reversed orientation in which the first surface overlays the upwardly facing surface, the support wall of the forward panel abuts the rearward panel, and the edge of the forward panel abuts the rear seat assembly.

15. The vehicle cargo area structure according to claim 14, wherein
the support wall of the forward panel includes a fourth gap that extends to the first surface and the second surface of the forward panel and is spaced apart from the third gap such that the hinge structure of the seat cushion portion extends into the fourth gap with the forward panel in the second reversed orientation.

* * * * *